United States Patent [19]
Arai et al.

[11] 3,776,357
[45] Dec. 4, 1973

[54] ANTI-SKID CONTROL SYSTEM

[75] Inventors: Hiroshi Arai; Jun Ohta, both of Toyota, Japan

[73] Assignee: Toyota Jidosha Kogyo Kabushiki Kaisha, Toyota-shi, Aichi-ken, Japan

[22] Filed: July 16, 1971

[21] Appl. No.: 163,349

[30] Foreign Application Priority Data
Feb. 23, 1971 Japan.................................. 46/8414

[52] U.S. Cl.......... 180/82 R, 180/77 R, 303/21 BE, 180/105 E, 188/181 C
[51] Int. Cl............................................. B60k 31/00
[58] Field of Search.................. 180/82 R, 77 R; 303/20, 21 P, 21 BE, 21 CF; 317/5; 246/167 R; 105/61; 340/53

[56] References Cited
UNITED STATES PATENTS

| | | | |
|---|---|---|---|
| 2,842,108 | 7/1958 | Sanders | 180/82 |
| 3,356,082 | 12/1967 | Jukes | 317/5 X |
| 3,401,984 | 9/1968 | Williams et al. | 303/21 BE |
| 3,496,535 | 2/1970 | Tyzack | 180/82 X |
| 3,558,197 | 1/1971 | Lueck et al. | 303/21 BE |
| 3,560,759 | 2/1971 | Buehler et al. | 105/61 X |
| 3,627,074 | 12/1971 | Burckhardt | 180/82 |
| 3,663,070 | 5/1972 | Scharlack | 303/21 P |

*Primary Examiner*—Kenneth H. Betts
*Attorney*—David Toren et al.

[57] ABSTRACT

In the anti-skid system disclosed, a vehicle's wheel is protected from skidding in response to rapid acceleration, by comparing the wheel velocity with a reference signal that follows the wheel velocity but only within a predetermined maximum rate of velocity rise, and by then attenuating the wheel's drive to slow its acceleration. According to one embodiment of the invention a wheel velocity voltage generator generates a wheel velocity signal. An operational amplifier responding to the wheel velocity signal and an integrating circuit establish the reference signal that can rise up to a predetermined rate. A comparator derives an output signal when the rise rate in the wheel velocity signal exceeds the maximum rise rate of the reference signal. The output signal releases a free-running multivibrator that periodically interrupts power to the ignition system so the latter attenuates the wheel acceleration.

42 Claims, 4 Drawing Figures

ANTI-SKID CONTROL SYSTEM

REFERENCE TO COPENDING APPLICATION

This application is related to the copending application of Takeshi Ochiai, Ser. No. 109,465, filed Jan. 25, 1971 now abandoned for SKID CONTROL SYSTEM. It is also related to the application of Takeshi Ochiai, Ser. No. 109,461, filed Jan. 25, 1971 now abandoned for SKID CONTROL SYSTEM FOR VEHICLES.

BACKGROUND OF THE INVENTION

This invention relates to anti-skid systems for vehicles, particularly for preventing the wheels of vehicles such as automobiles from slipping when sudden acceleration is applied to start such vehicles or to speed them up.

When a vehicle's wheels are rapidly accelerated at the time the vehicle is started or while the vehicle is traveling and the driving torque from the engine substantially exceeds the torque of the reaction force applied by the ground engaging the surface of the wheel, the so-called tire torque, the driven wheel will slip and run idle. This wheel idling is most likely to develop when the coefficient of friction between the tire and the road surface is small. This is the case when the vehicle is traveling on a gravel road, a snow covered road, a frozen road, or the like. Under such conditions, the resistance of the wheel to lateral displacement of the vehicle is decreased. The vehicle may respond with irregular turns or by spinning around.

An object of this invention is to prevent wheel slips regardless of the amount of acceleration applied by the accelerator pedal.

Another object of the invention is to prevent the before mentioned problems.

SUMMARY OF THE INVENTION

According to a feature of the invention, the above-identified disadvantages are obviated and the objects obtained, by comparing the velocity of a wheel with a reference signal that follows the wheel velocity but only up to a predetermined rate of velocity rise, and by then attenuating the wheels' drive to slow its acceleration.

According to another feature of the invention the wheels' acceleration is slowed by interrupting the emission of engine ignition sparks. According to another feature of the invention the wheel acceleration is slowed by stopping the fuel supply to the engine. This prevents the generation of useless engine torque which causes slippage of the wheels and idle rotation.

According to yet another feature of the invention, wheel velocity generating means generate a velocity signal corresponding to the velocity of the wheel. Reference means responsive to the generating means establish a reference signal that corresponds to the velocity of the wheel and increases at a predetermined rate when the wheel velocity signal exceeds the predetermined rate. Comparator means respond to the generating means and the reference means to generate a comparison signal corresponding to the comparison of the reference signal and the velocity signal.

According to still another feature of the invention the reference means includes an operational amplifier for comparing the beforementioned reference signal and the wheel velocity signal, and another operational amplifier for determining the reference signal by integrating the wheel velocity signal upon receipt of the output signal of the operational amplifier.

According to still another feature of the invention, the control means include a free-running multivibrator which operates in response to signals indicating that the rate of velocity rise exceeds the predetermined rate and causes a circuit to interrupt the primary current of an ignition coil of the vehicle's engine.

These and other features of the invention are pointed out in the claims. Other objects and advantages of the invention will become known from the following detailed description when read in light of the accompanying drawings.

DESCRIPTION OF PREFERRED EMBODIMENTS

Figure 1:
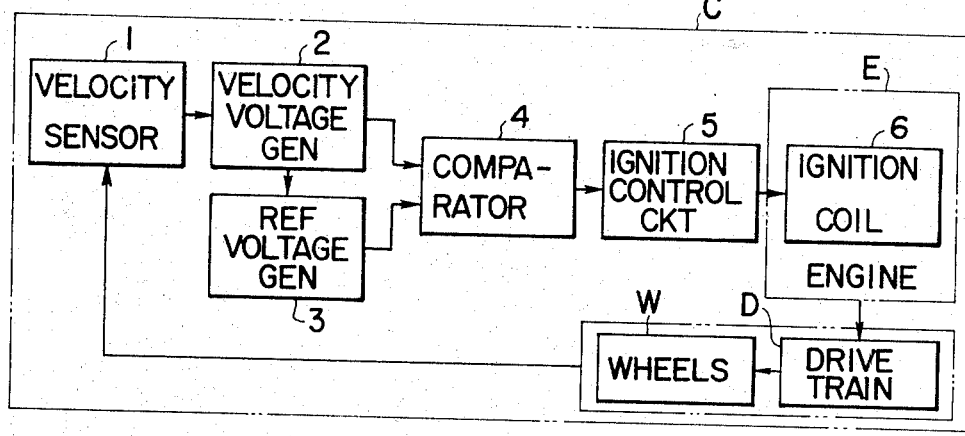
FIG. 1 is a block diagram of an anti-skid system used in a vehicle and embodying features of the invention.

In FIG. 1, a wheel velocity sensor 1 detects the wheel velocity of a driving wheel by means of a rotation detector installed on each wheel, a speed meter installed on the output shaft of a transmission for measuring the number of rotations, or the like. The sensor derives electrical signals which vary linearly with the velocity of the driving wheel.

A wheel velocity voltage generator 2 generates a wheel velocity voltage corresponding to the wheel velocity detected by the wheel velocity sensor 1. In response to signals from the wheel velocity voltage generator 2, a reference voltage generator 3 produces a reference voltage which corresponds to the wheel velocity voltage as long as the rise rate of the wheel velocity voltage remains below a predetermined maximum. The reference voltage generator 3 establishes a maximum rate of rise. When the wheel velocity voltage exceeds that rise rate the reference voltage generator 3 stops following but rises only at the maximum rate. A comparator 4 compares the wheel velocity voltage from the generator 2 and the reference voltage from the generator 3. It derives an output voltage when the wheel velocity voltage exceeds the reference voltage. This of course occurs when the velocity voltage rise rate exceeds the maximum rise rate. An ignition control circuit 5 interrupts engine ignition sparks from an ignition coil 6 when the output voltage is derived from the comparator 4.

The system of FIG. 1 forms part of an automobile C having the usual internal combustion engine E, wheels W, and drive train D, etc.

Figure 2:
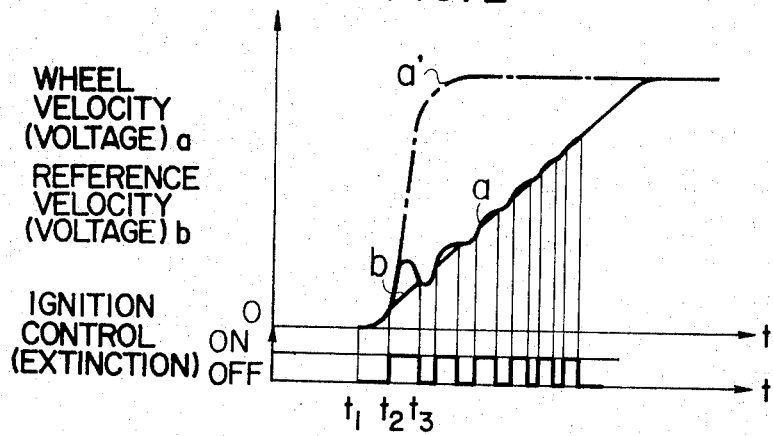
FIG. 2 is a graph illustrating the velocity of a wheel with respect to time in the system of FIG. 1 for the purpose of explaining the operation of the anti-skid device of FIG. 1.

The principle of operation of the above-described anti-skid system is illustrated in FIG. 2. Here the abscissa represents time and the ordinate represents the wheel velocity and the reference velocity as well as the operating condition of the ignition control circuit 5. The ordinate may also be considered to represent the wheel velocity voltage and the reference voltage since these are linearly related to the corresponding velocities.

At time $t_1$, an accelerator pedal accelerates the engine E through a throttle valve. The wheel velocity increases as shown by the curve $a$. A corresponding wheel velocity voltage which conforms to the wheel velocity is generated by the wheel velocity generator 2. This voltage may also be considered as being represented by the curve $a$. At this time the reference voltage generator 3 follows the voltage of the wheel velocity as long as it does not exceed the critical acceleration or maximum acceleration established by the generator 3. This maximum acceleration or maximum rate of rise in reference voltage is shown by the curve $b$. It represents a maximum acceleration produced by the driving torque from the engine that can be expected to allow the tire to keep gripping the road surface. The generator 3 thus generates the reference voltage which changes according to the way the velocity changes within this maximum acceleration. When the wheel acceleration exceeds the maximum acceleration set, the reference voltage rises at the maximum rate only.

When the increase in the rate of the wheel velocity as indicated by the wheel velocity voltage, makes the wheel velocity higher than the rising reference velocity as indicated by the reference voltage at the time $t_2$, the comparator 4 derives an output voltage in accordance with the difference between the magnitude of both voltage signals. As a result of this output the control circuit 5 is turned on to extinguish the ignition coil 6. As a result the wheel velocity that was increasing starts to drop.

At the time $t_3$ the wheel velocity becomes less than the reference wheel velocity. That is to say at the time $t_3$ the wheel velocity drops below the reference voltage. The comparator 4 then stops producing an output voltage. This turns off the control circuit 5. The inertial force inherent in the wheel system starts the engine again at this time so as to accelerate the wheels again.

The acceleration and deceleration described above is repeated. Finally the wheel velocity change follows the reference wheel velocity change. Thus the wheel is accelerated without slip.

The above operation is identical whether the potential wheel slip arises while the vehicle is standing still or while the vehicle is moving at a constant velocity. If the anti-skid system according to this invention were not employed the wheel velocity would rapidly increase as shown by the curve $a'$. This would cause wheel slip. The vehicle body would not be accelerated at all.

Figure 3:
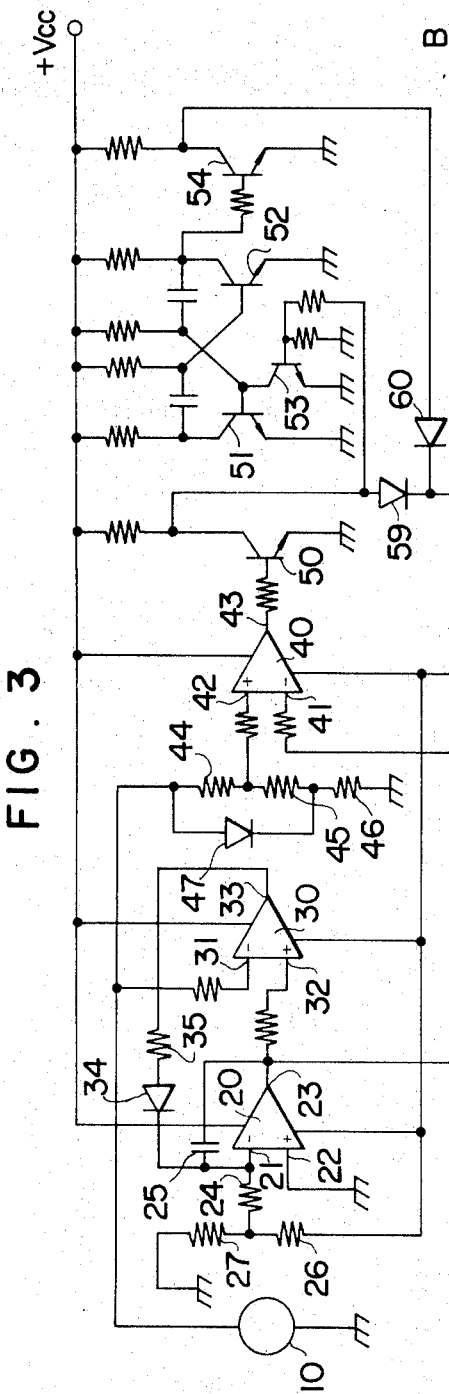
FIG. 3 is a schematic diagram of an anti-skid system used in a vehicle and embodying features of the invention.

In the embodiment illustrated in FIG. 3, a wheel velocity voltage generator 10 generates a DC voltage having a linear relation with respect to the rotational speed of the driving wheel as described above. An operational amplifier 20 having a negative-phase input terminal 21 and a grounded positive-phase input terminal 22 as well as an output terminal 23 forms an operational integrator with an input resistor 24 and an integrating feedback capacitor 25. The negative-phase input is biased to a negative voltage by a voltage divider composed of resistors 26 and 27 connected between ground and a negative voltage $-Vcc$. The resistor 24 and capacitor 25 integrate the voltage at the junction of resistors 26 and 27. A positive voltage $+Vcc$ energizes the operational amplifier 20 with a positive potential. The source $-Vcc$ furnishes negative potential to the amplifier 20.

In a second operational amplifier 30 a negative-phase input terminal 31 receives the DC voltage from the generator 10. A positive-phase input terminal 32 serves as another differential input terminal in the operational amplifier 30. The terminal 32 receives its input from the output terminal 23 of the operational amplifier 20. The voltages $+Vcc$ and $-Vcc$ serve as supply voltages for the operational amplifier 30.

If the positive-phase input potential exceeds the negative-phase input potential, the value $+Vcc$ is obtained at an output terminal 33 of the amplifier 30. If the negative-phase input potential exceeds the positive-phase input potential the value $-Vcc$ is obtained at the terminal 33.

A feedback circuit composed of a diode 34 and a resistor 35 in series therewith passes positive voltages appearing at the output terminal 33 to the negative-phase input terminal 21 of the amplifier 20. The positive phase input terminal 32 of the amplifier 30 is connected to the output terminal 23 of the amplifier 20.

When the DC voltage is generated by the wheel velocity voltage generator 10, the potential at the negative-phase input terminal 31 of the operational amplifier 30 exceeds that of the positive phase input terminal 32. This decreases the potential at the output terminal 33 to $-Vcc$. As a result the diode 34 is driven into nonconduction. The potential to be applied to the negative-phase input terminal 21 of the first operational amplifier 20 becomes negative by a value corresponding to the potential obtained by dividing the supply voltage $-Vcc$ between the resistor 26 and 27. On the other hand, the grounded positive phase input terminal 22 tends to increase the potential of the output terminal 23 to the $+Vcc$.

Now if the potential at the negative phase input terminal 21 is $e_i$ and the potential at the output terminal is $e_o$ then $$e_0 = (1/RC) \int e_i dt$$

The resistance value of the resistor 24 is R and the electrostatic capacitance of the capacitor 25 is C.

The capacitor 25 is charged to $e_0$ with the polarities illustrated. If $e_i$ is constant the rate of increase of the voltage at the output terminal 23 is determined by the time constant CR. The potential of the output terminal 23 that is increased after being set as described above is applied to the positive-phase input terminal 32 of the second operational amplifier 30. When the potential exceeds the potential at the negative phase input terminal 31 the potential at the output terminal 33 of the second operational amplifier 30 changes over to $+Vcc$. This causes the diode 34 to conduct.

The voltage obtained by distributing the supply voltage $-Vcc$ over the resistors 26, 27 and 24 is then applied to the negative-phase input terminal 21 of the first operational amplifier 20. Because the resistance value of the resistor 27 is smaller than that of the resistor 26, the potential at the negative-phase input terminal 21 exhibits a positive value. The output terminal 23 thus discharges the electric charge on the capacitor 25 in an effort to become a negative potential. However, the time constant of the discharge is far smaller than that during charging. Therefore, the voltage set by the capacitor 25 at the output terminal 23 remains almost constant.

When the potential at the output terminal 23 of the operational amplifier 20 becomes lower than the at the negative-phase input terminal 31 of the amplifier 30 the potential at the output terminal 33 again drops to −Vcc. This charges the capacitor 25 as described above and maintains the voltage at a constant value.

As long as the wheel velocity voltage is maintained at a constant value the voltage identical to this wheel velocity voltage is memorized at the output terminal 23 of the first operational amplifier 20. When the wheel velocity voltage rapidly increases and the rate of change thereof exceeds the value determined by the time constant CR the voltage at the output terminal 23 increases at a rate determined by the time constant CR. The voltage thus set serves as the reference wheel velocity voltage.

A comparator 40 receives the reference voltage appearing at the terminal 23 on a negative-phase input terminal 41. A positive-phase input terminal 42 receives the wheel velocity voltage from the generator 10 through a voltage dividing circuit composed of resistors 44, 45 and 46 that divide the wheel velocity voltage and a diode 47 whose cathode and anode connect across the resistors 44 and 45. The comparator receives supply voltages 'Vcc and −Vcc in the same manner as the operational amplifiers 20 and 30.

As long as the wheel velocity voltage exceeds the forward voltage of the diode 47 the wheel velocity voltage at the steady state wheel velocity is taken by the voltage dividing circuit to be a value lower than the actual reference wheel velocity voltage by a value which may, for example, correspond to 2 to 3 km/hr. Thus ripple components contained in the wheel velocity voltage in the comparator 40 do not cause errors in comparing voltages. Thus a true component of wheel velocity voltage is compared with the reference voltage. If the wheel velocity voltage is lower than the reference voltage or the voltage increase rate is small the potential at the output 43 becomes −Vcc because of the voltage dividing circuit. When the opposite voltages prevail the potential at the output terminal 43 is +Vcc.

The base of a transistor 50 receives the voltage at the output terminal 43. The emitter of the transistor 50 is grounded and the collector thereof applies its voltage to the base of a transistor 53. The collector of the transistor 53 is connected to the base of a transistor 51. The transistor 51 forms a free-running multivibrator with a second transistor 52. The base of a transistor 54 receives the voltage appearing at the collector of the transistor 52. The voltage +Vcc energizes the collectors of the transistors 50 through 54.

The transistors 50 and 54 serve as inverters for phase inversion. A pair of diodes 59 and 60 which constitute an OR circuit apply the voltages appearing at the collectors of transistors 50 and 54 to the base of a switching transistor 55. A transistor 56 in emitter follower connection applies the voltage of the collector on transistor 55 to the base of a transistor 57 whose emitter varies the voltage at the base of a transistor 58. The transistor 56 thus acts as an impedance converter. The collector of the transistor 58 is connected so the transistor when conducting effectively shorts out a winding 71 of an ignition circuit 70. The voltage B of a battery power source is applied to the transistors 55 through 57. The transistors 56 through 58 are used for power amplification.

When the potential at the output terminal 43 of the comparator 40 is −Vcc the transistor 50 becomes non-conductive. This makes the potential at its collector high so that it causes transistor 53 to become conductive. Conduction of the transistor 53 turns off the transistor 51 and holds if off while holding transistor 52 on. The conducting transistor 52 turns off the transistor 54 while the multivibrator no longer oscillates.

The potential at the collector transistor 54 is now high. This high potential is applied to the base of switching transistor 55 through the diode 60. In this case the potential at the base side of the transistor 55 is divided and is lower than the voltage B applied at the collector. Nevertheless the voltage at the base is positive and causes transistor 55 to conduct. As a result transistors 56, 57 and 58 are driven into non-conduction.

If the potential at the output terminal 43 of the comparator 40 is +Vcc the transistor 50 is driven into conduction and the transistor 53 is driven into non-conduction.

The non-conduction of transistor 53 allows the multivibrator to oscillate. The potentials appearing at the diode 59 and coming intermittently through the diode 60 are applied to the base of transistor 55. The transistor responds to the intermittent potential by turning on and off at a period determined by the multivibrator composed of transistors 51 and 52. This turns the transistors 56, 57 and 58 on and off.

If on the other hand, in response to a reference voltage above the velocity voltage as it appears at terminal 42, the potential of terminal 43 is negative, transistor 50 turns off. This turns on transistor 55 and turns off transistor 56, 57, and 58.

The ignition circuit 70 produces a rise of current from the battery source B through the winding 71 of the ignition coil composed of windings 71 and 72. The winding 71 is a primary winding and the winding 72 a secondary winding of the ignition coil. The ignition includes a distributor breaker point 73 and a cam 74 driven by the engine cam shaft so as to be synchronized with ignition timing. A speed-up resistor 75 prevents a voltage drop especially during high speed rotation. When the transistor 58 is driven into non-conduction, a high ignition voltage is generated by the windings 71 and 72 of the ignition coil and the breaker point 73. When the transistor 58 conducts the larger part of the current is by-passed by the transistor 58 and the electromagnetic energy to be stored at the primary winding 71 disappears. Consequently, the ignition voltage does not exist at the secondary winding during conduction of the transistor 58 and the ignition coil is extinguished.

Figure 4:
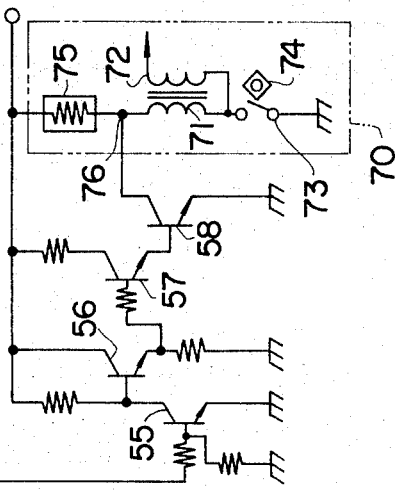
FIG. 4 is a voltage-time graph for explaining the operation of the system in FIG. 3.
Figure 4:
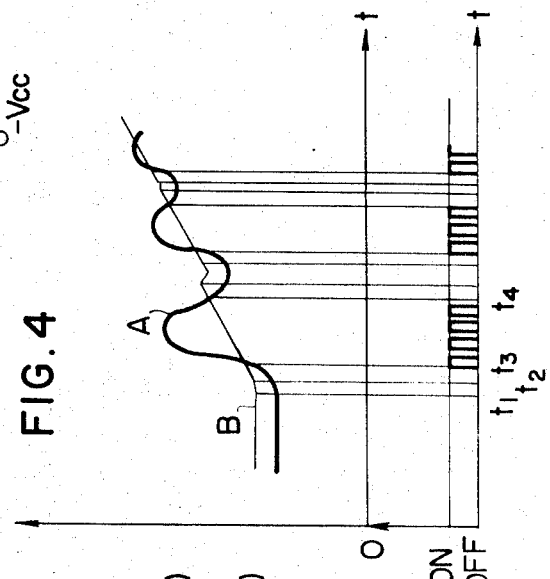

The operation of the circuit in FIG. 3 will be described with reference to FIG. 4. In FIG. 4 the ordinate represents the wheel velocity voltage and the reference voltage. The abscissa represents time. Under steady state travel conditions until the time $t_1$ the wheel velocity voltage shown by the curve A is maintained at a value lower than the reference voltage shown by the curve B.

When the wheel is suddenly accelerated at the time $t_1$, and at the time $t_2$ the acceleration exceeds the preset acceleration, for example 0.4g, where g is the gravitational acceleration, the reference voltage increases at the rate of 0.4g due to the increase in the wheel velocity voltage. However, the wheel velocity voltage increases in accordance with the acceleration applied thereto and exceeds the reference voltage at the time $t_3$.

When the wheel velocity voltage exceeds the reference voltage at the time $t_3$ the comparator 40 constrains the transistor 58 to extinguish the ignition circuit 70 intermittently. The intermittent extinction causes the wheel velocity and its corresponding voltage gradually to decrease until it drops below the reference voltage at the time $t_4$. As soon as the wheel velocity voltage drops below the reference voltage at the time $t_4$ the intermittent extinguishing action is stopped. This allows the ignition circuit 70 to increase the wheel velocity as occurred at the time $t_2$. However, because the preceding intermittent extinguishing action decreased the engine torque, the increase in the rate of wheel velocity also decreases. This sets the reference voltage at a somewhat lower value.

The above described operation is repeated several times. As a result the wheel velocity gradually begins to follow the reference velocity as expressed by the maximum reference voltage rise.

As is apparent from the above description rapid acceleration causes the anti-skid system according to this invention to control the wheel velocity without requiring the driver to change the position of the accclerator pedal. The anti-skid system makes the wheel velocity that is rapidly being accelerated become identical to the reference velocity, as expressed by the reference voltage, while the reference velocity follows the critical predetermined maximum acceleration desirable as determined by the tire and road surface condition at that time. Therefore, wheel slip due to a wheel velocity exceeding the critical acceleration or maximum acceleration can be to a large extent almost entirely prevented.

Experiments which set the maximum or critical acceleration at 0.4g and the timing of the multivibrator so as to produce extinguishing times of 80 ms and ignition times of 30 ms during the "extinction" cycle of the ignition circuits 70, confirm the advantageous effect of the anti-skid system according to this invention on slippery road surfaces such as gravel roads. The effect of the invention, however, should not be limited to the above mentioned accelerations or times.

As in FIG. 1, the system of FIG. 3 forms part of a vehicle such as an automobile A that includes an engine, wheels, a transmission, accelerator pedal, carburator, etc.

For simplicity the operation of the amplifiers 20 and 30 may be considered another way. When the reference voltage exceeds the wheel velocity voltage the amplifiers 20 and 30 may be considered to form a closed negative-feedback loop. The loop includes the amplifier 30 feeding through the diode 34 to the amplifier 20 which feeds back to the terminal 32. Due to the high gain of the amplifiers and the negative feedabck, the output terminal 23 tends to drive the terminal 32 to substantially the same value as the wheel velocity voltage at the input terminal 31. Since the output terminal 23 is virtually at the value of input terminal 32 the output reference voltage at 23 is substantially equal to the wheel velocity voltage.

When the wheel velocity voltage starts to exceed the reference voltage, the voltage at the output 33 of the amplifier 30 is negative and the diode cuts off the loop action. Momentarily the reference voltage continues to assume the last reference value which appears at the plate of charged capacitor 25 near the output 23. However, the absence of a positive voltage at input 21 allows the amplifier 20 to operate as a so-called operational integrator or Miller integrator or ramp generator. Specifically, the output 23 tends to use the negative feedback capacitor 25 to force the negative bias at the input terminal 21 to assume the ground potential at the input terminal 22. The capacitor can do this only by charging continuously at a rate RC. This raises the voltage at output terminal 23 at the rate RC. If the rate of rise at the wheel velocity voltage has been less than RC the reference voltage quickly catches up to the velocity voltage and loop operation then resumes.

By stopping and starting loop operation in this manner the reference voltage essentially follows the velocity voltage. However, if the velocity voltage rises at a rate greater than RC then the open loop condition continues to exist. The reference voltage then rises only at the rate RC starting from the value of reference voltage at which the velocity voltage began to rise rapidly. The amplifier 40 then compares the voltage differences.

Operational amplifiers and operational integrators or Miller integrators are described more fully in Pulse, Digital, and Switching Waveforms by Millman and Taub, Published 1965 by the McGraw Hill Book Company.

The comparator amplifier 40 compares the reference voltage at terminal 41 with a somewhat reduced version of the wheel velocity voltage at terminal 42. When the reference voltage is greater or equal to the velocity voltage the output of amplifier 40 is negative. This turns off transistor 50, turns on transistors 53 and 55, and turns off transistors 56, 57 and 58. This allows circuit 70 to operate the ignition coil 71, while inhibiting oscillation in multivibrator 51, 52. When the velocity voltage exceeds the reference voltage for a long enough time for the effect to appear at terminal 42 the amplifier 40 turns on transistor 50, and turns off transistors 53 and 55. This releases the multivibrator and allows transistor 54 to turn the transistor 55 on and off. Transistors 56, 57 and 58 turn off and on so that the operation of the induction coil 71 is intermittently interrupted.

While embodiment of the invention have been described in detail it will be obvious to those skilled in the art that the invention may be embodied otherwise without departing from its spirit and scope.

What is claimed is:

1. An anti-skid system for a vehicle having a wheel and means for accelerating the wheel, comprising wheel velocity generating means for generating a velocity signal corresponding to the velocity of the wheel, reference means responsive to said generating means for establishing a reference signal that corresponds to the velocity of the wheel and increases at a predetermined rate when the wheel velocity signal exceeds the predetermined rate, and comparator means responsive to said generating means and said reference means for generating a comparison signal corresponding to the comparison of the reference signal and the velocity signal, and control means connected to the means for accelerating the wheel for controlling the wheel velocity in accordance with the comparison signal, said control means including oscillating means, inhibiting means responsive to said comparator means for turning said oscillating means on in response to a comparison signal that indicates that the velocity signal exceeds the reference signal and turning it off at other times, and regulator means connected to the means for accelerating the wheel for intermittently interrupting the acceleration on the basis of said oscillator means.

2. A system as in claim 1, wherein said oscillator means includes a free-running multivibrator having an output that reverses according to a predetermined time ratio.

3. A system as in claim 2, wherein said control means includes means for interrupting operation of an ignition coil.

4. A system as in claim 2, wherein said control means includes a unit for interrupting the fuel system of an engine.

5. A system as in claim 1, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

6. A system as in claim 5, wherein said control means includes means for interrupting operation of an ignition coil.

7. A system as in claim 5, wherein said control means includes a unit for interrupting the fuel supply of an engine.

8. A system as in claim 5, wherein said integrating means includes an operational integrator and wherein said differential circuit means includes a differential operational amplifier having an output connected to the input of said operational integrator, said output including a diode.

9. A system as in claim 8, wherein said control means includes means for interrupting operation of an ignition coil.

10. A system as in claim 8, wherein said control means includes a unit for interrupting the fuel supply of an engine.

11. A system as in claim 2, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

12. A system as in claim 11, wherein said integrating means includes an operational integrator and wherein said differential circuit means includes a differential operational amplifier having an output connected to the input of said operational integrator, said output including a diode.

13. A system as in claim 12, wherein said control means includes means for interrupting operation of an ignition coil.

14. A system as in claim 12, wherein said control means includes a unit for interrupting the fuel supply of an engine.

15. A system as in claim 11, wherein said control means includes means for interrupting operation of an ignition coil.

16. A system as in claim 11, wherein said control means includes a unit for interrupting the fuel supply of an engine.

17. A system as in claim 1, wherein said control means includes means for interrupting operation of an ignition coil.

18. A system as in claim 1, wherein said control means includes a unit for interrupting the fuel supply of an engine.

19. An anti-skid system for a vehicle having a wheel and means for accelerating the wheel, comprising reference means for generating a reference velocity signal rising at a predetermined rate, comparison means responsive to said reference means and the wheel for comparing the velocity of the wheel with the reference velocity and for lowering the reference signal to the wheel velocity when the wheel velocity is lower than the reference velocity, and means responsive to said comparison means for inhibiting the operation of the means to accelerate the wheel, said control means including oscillating means, inhibiting means responsive to said comparator means for turning said oscillating means on in response to a comparison signal that indicates that the velocity signal exceeds the reference signal and turning it off at other times, and regulator means connected to the means for accelerating the wheel for intermittently interrupting the acceleration on the basis of said oscillator means.

20. A system as in claim 19, wherein said oscillator means includes a free-running multivibrator having an output that reverses according to a predetermined time ratio.

21. A system as in claim 19, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

22. A system as in claim 19, wherein said integrating means includes an operational integrator and wherein said differential circuit means includes a differential operational amplifier having an output connected to the input of said operational integrator, said output including a diode.

23. A system as in claim 20, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

24. A system as in claim 20 wherein said integrating means includes an operational integrator and wherein said differential circuit means includes a differential operational amplifier having an output connected to the input of said operational integrator, said output including a diode, said reference means includes integrating means for establishing the reference signal and causing it to rise at the predetermined rate, said reference means further including differential circuit means responsive to the reference signal at the velocity signal for producing a differential signal and lowering the reference signal to the value of the velocity signal when the velocity signal is less than the rising reference signal.

25. A system as in claim 20, wherein said integrating means includes an operational integrator and wherein said differential circuit means includes a differential operational amplifier having an output connected to the input of said operational integrator, said output including a diode.

26. A system as in claim 19, wherein said control means includes means for in terrupting operation of an ignition coil.

27. A system as in claim 19, wherein said control means includes a unit for interrupting the fuel supply of an engine.

28. A vehicle comprising an engine, wheels, accelerating means for accelerating the velocity of the wheel, reference means for establishing a velocity reference signal that rises at a predetermined value, comparison means for comparing the velocity of one of said wheels with the reference velocity and for lowering the reference velocity to the value of the wheel velocity, and control means responsive to said comparison means for regulating said accelerating means so as to slow the wheel velocity when the wheel velocity is rising faster than the reference velocity, said control means including oscillating means, inhibiting means responsive to said comparator means for turning said oscillating means on in response to a comparison signal that indicates that the velocity signal exceeds the reference signal and turning it off at other times, and regulator means connected to the means for accelerating the wheel for intermittently interrupting the acceleration on the basis of said oscillator means.

29. A system as in claim 28, wherein said oscillator means includes a free-running multivibrator having an output that reverses according to a predetermined time ratio.

30. A system as in claim 29, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

31. A system as in claim 29 wherein said integrating means includes an operational integrator and wherein said differential circuit means includes a differential operational amplifier having an output connected to the input of said operational integrator, said output including a diode, said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

32. A system as in claim 29, wherein said integrating means includes an operational integrator and wherein said differential circuit means includes a differential operational amplifier having an output connected to the input of said operational integrator, said output including a diode.

33. A system as in claim 28, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

34. A system as in claim 28, wherein said integrating means includes an operational integrator and wherein said differential circuit means includes a differential operational amplifier having an output connected to the input of said operational integrator, said output including a diode.

35. A vehicle comprising an engine, at least one wheel responsive to the engine, accelerator means for causing said engine to accelerate the velocity of the wheel, wheel velocity generating means responsive to the rotation of the wheel for generating a velocity signal corresponding to the velocity of the wheel, reference means responsive to said generating means for establishing a reference signal that corresponds to the velocity of the wheel and increases at a predetermined rate when the wheel velocity signal exceeds the predetermined rate, and comparator means responsive to said generating means and said reference means for generating a comparison signal when the velocity signal rises at a rate faster than the reference signal, and control means connected to the accelerating means for slowing the wheel velocity so that it increases at a rate up to the increase of the reference signal, said control means including oscillating means, inhibiting means responsive to said comparator means for turning said oscillating means on in response to a comparison signal that indicates that the velocity signal exceeds the reference signal and turning it off at other times, and regulator means connected to the means for accelerating the wheel for intermittently interrupting the acceleration on the basis of said oscillator means.

36. A system as in claim 35, wherein said oscillator means includes a free-running multivibrator having an output that reverses according to a predetermined time ratio.

37. A system as in claim 35, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

38. A system as in claim 35, wherein said integrating means includes an operational integrator and wherein said differential circuit means includes a differential operational amplifier having an output connected to the input of said operational integrator, said output including a diode.

39. A system as in claim 35, wherein said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

40. A system as in claim 35, wherein said integrating means includes an operational integrator and wherein said differential circuit means includes a differential operational amplifier having an output connected to the input of said operational integrator, said output including a diode, said reference means includes integrating means for establishing the reference signal and causing it to rise at the predetermined rate, said reference means further including differential circuit means responsive to the reference signal and the velocity signal for producing a differential signal and lowering the reference signal to the value of the velocity signal when the velocity signal is less than the rising reference signal.

41. A system as in claim 35, wherein said control means includes means for interrupting operation of an ignition coil.

42. A system as in claim 35 wherein said control means includes a unit for interrupting the fuel supply of an engine.

* * * * *